United States Patent [19]

Ohba et al.

[11] 4,335,888
[45] Jun. 22, 1982

[54] MECHANICAL SEAL

[75] Inventors: Kanji Ohba; Shigenari Itoi, both of Kobe, Japan

[73] Assignee: Nippon Pillar Packing Co. Ltd., Osaka, Japan

[21] Appl. No.: 175,880

[22] Filed: Aug. 7, 1980

Related U.S. Application Data

[63] Continuation-in-part of Ser. No. 938,690, Aug. 31, 1978, abandoned.

[30] Foreign Application Priority Data

Mar. 20, 1978 [JP] Japan ............... 53-36503[U]

[51] Int. Cl.³ .................................. F16J 15/34
[52] U.S. Cl. ........................................ 277/96.1
[58] Field of Search ............ 277/96, 96.1, 96.2, 277/93, 91, 93 SD, 92

[56] References Cited

U.S. PATENT DOCUMENTS

| | | | |
|---|---|---|---|
| 2,122,378 | 6/1938 | McCormack | 277/88 |
| 2,354,478 | 7/1944 | Reinhardt et al. | 286/11 |
| 2,949,321 | 8/1960 | Tracy | 286/9 |
| 3,180,648 | 4/1965 | Kupfert et al. | 277/92 |
| 3,201,135 | 8/1965 | Hayatian | 277/92 |
| 3,392,984 | 7/1968 | Reinsma et al. | 277/92 |
| 3,767,212 | 10/1973 | Ludwig | 277/25 |
| 3,810,637 | 5/1974 | Bonvin | 277/96.2 |
| 4,087,100 | 5/1978 | Yoshihashi et al. | 277/92 |
| 4,104,169 | 8/1978 | Muller et al. | 210/331 |
| 4,118,040 | 10/1978 | Christ et al. | 277/75 |

FOREIGN PATENT DOCUMENTS 1155644 10/1963 Fed. Rep. of Germany ..... 277/96.1

Primary Examiner—Robert I. Smith
Attorney, Agent, or Firm—Steele, Gould & Fried

[57] ABSTRACT

A mechanical seal wherein a smooth sealing end surface is formed at one end of a rotation seal ring and a stationary seal ring, while a sharp edge-like sealing end portion in slidable contact with the smooth sealing end surface is formed at the other of seal rings, the sealing end portion having a width of 0.1 to 0.3 mm, and the spring face pressure to be imparted to that portion of sealing end portion which slidably contacts with the sealing end surface is set to a relatively high value from 30 to 50 kg/cm². Materials of which the sealing end surface and the sealing end portion are made are selected from hard ceramics.

9 Claims, 3 Drawing Figures

MECHANICAL SEAL

CROSS-REFERENCE TO RELATED APPLICATIONS

This application is a continuation-in-part of application Ser. No. 938,690, filed on Aug. 31, 1978, and now abandoned for a mechanical seal.

BACKGROUND OF THE INVENTION

The present invention relates to a mechanical seal for use in sealing rotation shafts such as those of liquid transfer pumps.

Each of mechanical seals used for sealing rotation shafts includes a rotation seal ring mounted on the rotating shaft and a stationary seal ring mounted on a casing, rotation and stationary seal rings having sealing end surfaces formed on their sides opposite to each other. The rotation seal ring, axially movable, is provided with a spring member which serves to urge the rotation seal ring toward the stationary seal ring. Therefore, the sealing end surface of rotation seal ring is slidably contacted with that of stationary seal ring by the action of the spring member and the pressure of liquid to be sealed. The width of sliding contact area between sealing end surfaces of seal rings is of several millimeters in this case.

However, it is difficult for the above-mentioned arrangement to accurately keep sealing end surfaces of rotation and stationary seal rings parallel to each other, said sealing end surfaces being slidably contacted with each other at the contact width of several millimeters. Therefore, it is common that only outer or inner circumference portions of sealing end surfaces are slidably contacted with each other because of pressure or heat distortion. It is also difficult to finish smooth sealing end surfaces each having a width of several millimeters in the radial direction thereof and a relatively wide area, and to keep the smoothness for a long period. Therefore, because of the face swelling of sealing end surfaces occuring in the radial direction thereof, sealing end surfaces are directly contacted with each other at a part thereof, while separated from each other at the other part thereof to form a relatively wide clearance therebetween. As a result, it becomes difficult to achieve an ideal sealing condition, that is, a condition under which sealing end surfaces are slidably contacted with each other with a thin liquid layer interposed therebetween, said liquid layer having a uniform thickness corresponding to several molecules. Said condition will be hereinafter referred to as the condition of boundary lubrication. Burning accidents will therefore be caused when the liquid layer interposed between sealing end surfaces becomes broken or too thin, while liquid leakage will increase when the liquid layer becomes too thick. Seal rings each having a sealing end surface whose width is large are necessarily made to form bulky block-shaped ones. When these seal rings are slidably contacted with each other, the heat generated between their sealing end surfaces is not easily dissipated into the liquid to be sealed, or the atmosphere and is likely to be stored in them. Accordingly, the temperature of sealing end surfaces becomes extremely high to make the lubrication bad, and causing burning accidents or abnormal wear of sealing end surfaces. These mechanical seals conventionally used for shaft sealing a variety of liquids are not yet employed in the fields of shaft sealing liquids which are most difficult to seal, said liquids including rubber-like ones such as latex which tend to coagulate under shearing friction, plastic ones copolymerized by sliding friction heat, petroleum ones such as heavy crude oil having high viscosity, black liquors in pulp industry, and mud water containing a large amount of slurry. The reason why conventional mechanical seals are not employed in the above-mentioned field is that a coagulated film of liquid to be sealed is formed and interposed between sealing end surfaces which are slidably contacted with each other over several-millimeters width and serves to separate sealing end surfaces from each other causing these sealing end surfaces to lose their sealing function in a matter of hours, and sometimes in minutes or seconds. The growth of this coagulated film can not be stopped even if each of sealing end surface is formed to have an extremely high smoothness below 1 $\mu$m. In addition, conventional mechanical seals can not achieve satisfactory sealing function when the pressure of liquid to be sealed becomes inverse, high or large in change. This is because the spring face pressure to be imparted to the sliding contact area between sealing end surfaces of conventional mechanical seals is usually set to a relatively low value from 0.5 to 2 kg/cm$^2$ (or from 7.11 to 28.44 lb/in$^2$). As a result, when inverse pressure or the like is caused, sealing end surfaces can not resist the force of such inverse pressure and are separated from each other to form a wide clearance therebetween, thus increasing liquid leakage remarkably. Namely, the balance ratio $S_2/S_1$ of conventional mechanical seals is usually in the range of from 0.7 to 1.2, wherein $S_1$ represents the sliding contact area between sealing end surfaces and $S_2$ that area of seal rings which is exposed to the pressure of liquid to be sealed. The lower balance ratio practically employed is of 0.65 and when it becomes lower than 0.5, no sealing function can be achieved theoretically. The pressure of liquid to be sealed gives great influence to the spring face pressure imparted to the sliding contact area between sealing end surfaces.

SUMMARY OF THE INVENTION

An object of the present invention is to provide a mechanical seal capable of preventing burning accidents and liquid leakage under the condition of boundary lubrication, continuous scraping off, by means of a sharp edge-like end portion, coagulated film formed at the sliding contact area between a rotation seal ring and a stationary seal ring to keep sealing function for a lengthy period of time, and reliably shaft sealing liquids which are most difficult to seal, such as latex.

Another object of the present invention is to provide a mechanical seal wherein the sealing end portion is formed like a sharp edge to make the sliding contact area thereof extremely small, so that the total amount of heat generated can be reduced to a minimum and the heat is not stored in seal rings but smoothly discharged from the sharp edge to the liquid in contact with the edge.

A further object of the present invention is to provide a mechanical seal capable of making constant, regardless of the pressure of liquid to be sealed, the spring face imparted to the sliding contact area between a rotation seal ring and a stationary seal ring and reliably shaft sealing liquids for a lengthy period of time, pressure of said liquids being inverse, high or large in change.

These and other objects as well as merits of the present invention will become apparent from the following

DETAILED DESCRIPTION OF THE PREFERRED EMBODIMENTS

Figure 1:
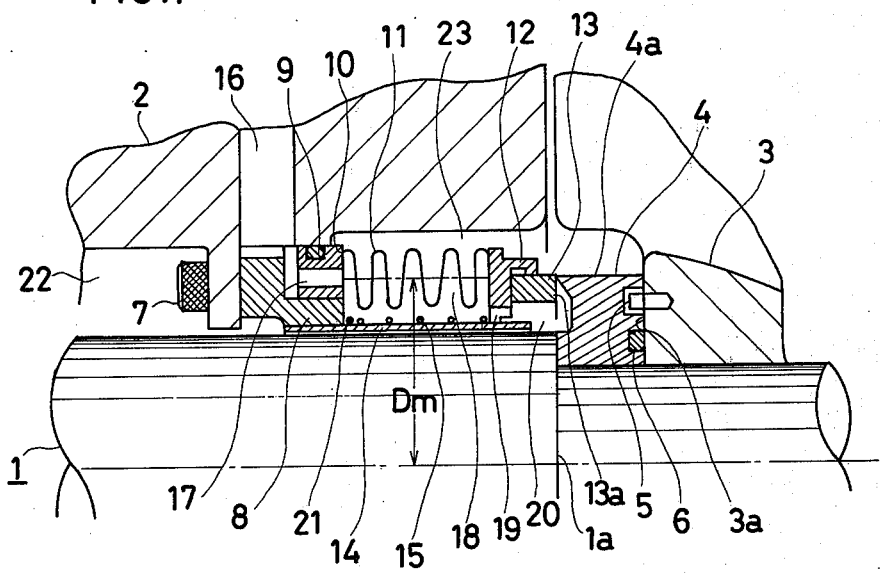
FIG. 1 is a partially sectioned view showing an embodiment of the present invention.

FIG. 1 is a partially sectioned view showing a pump for transferring a liquid such as latex in which an embodiment of the present invention is employed. A mechanical seal is formed between the outer circumference of a rotation shaft 1, which is rotary, and the inner face of a casing 2, which is stationary.

An impeller 3 is fitted onto that outer circumference of rotation shaft 1 which is on the pumping chamber side, and a rotation seal ring 4 is interposed between that end face 3a of impeller 3 which faces the sealing zone and that stepped end face 1a of rotation shaft 1 which faces the end face 3a of impeller 3. Said rotation seal ring 4 is attached and sealed to the end face 3a of impeller 3 by means of a knock pin 5 and an O-ring 6, respectively, and the impeller 3 is fixed on the rotation shaft 1. The assembly thus formed is rotatably arranged as a unit.

A retainer 8 is attached to the inner surface of casing 2, and to the retainer 8 is attached an adapter ring 10 which is provided with an O-ring 9 to seal between the inner surface of casing 2 and the adapter ring 10. A seal ring retainer 12 is supported by the adapter ring 10 through a bellows 11, and to the seal ring retainer 12 is fixed a stationary seal ring 13, of which sealing end surface 13a is brought into contact with the sharp edge-like end portion 4a of rotation seal ring 4, thus allowing a sealing to be achieved between the liquid side and the outside of pump. A baffle ring 14 projects from the retainer 8, extending adjacent to the stationary seal ring 13, and a coil spring 15 is arranged on the baffle ring 14 and between the retainer 8 and the seal ring retainer 12 to urge the stationary seal ring 13 toward the rotation seal ring 4.

A through-hole 16 is formed in the casing 2 and quenching liquid such as water supplied through the hole 16 is introduced through a through-hole 17 formed in the adapter ring 10, a space 18 between the bellows 11 and the baffle ring 14, and a through-hole 19 in the seal ring retainer 12 to a sealing chamber 20 formed inside the contacted rotation and stationary seal rings 4 and 13. The quenching liquid is discharged through a space 21 between the baffle ring 14 and the rotation shaft 1 to a discharging chamber 22. Numeral 23 represents a chamber through which the liquid to be sealed flows.

Figure 2:
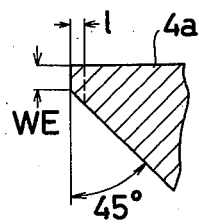
FIG. 2 is an enlarged section showing a sealing end portion of a rotation seal ring employed in the embodiment of the present invention shown in FIG. 1.

Each of rotation and stationary seal rings 4 and 13 is preferably made of combined materials having a high wear-proofness and being selected from ceramics consisting of SiC, WC, TiC, $Al_2O_3$ and the like. The sealing end portion 4a of rotation seal ring 4 is formed to have an inner circumferential face slanted 45 degrees relative to an axis perpendicular to the rotation shaft 1, as shown in FIG. 2, and a width WE of 0.1~0.3 mm at the end face thereof. The sealing end surface 13a of stationary seal ring 13 contacted with the sealing end portion 4a of rotation seal ring 4 has an accurate flatness below 1 $\mu m$. The bellows 11 is of metal having stable springy properties and molded or welded to have a simple shape, and cooperates with the coil spring 15 to cause a spring face pressure of 30~50 kg/$cm^2$. That face of bellows 11 which is exposed to the liquid chamber 23 is coated with a fluorine resin such as ethylene tetrafluoride so as to reduce friction resistance and to prevent the fluid to be sealed from adhering thereto. In addition, the pressure of quenching liquid is set somewhat higher than that of liquid to be sealed.

The outer circumference of that sharp edge-like end portion 4a of rotation seal ring 4 which is contacted with the sealing end surface 13a of stationary seal ring 13 is made aligned with the center axis of bellows 11 parallel to and having a distance Dm from the center axis of shaft 1, thus permitting a balance ratio K to be set to substantially zero. The urging force which is applied from the liquid to be sealed to the stationary seal ring 13 through the bellows 11 depends on the central diameter Dm of bellows 11. This central diameter Dm is a line passing through the center of inner and outer diameters of bellows 11, said center being expressed by the following equation:

$$Dm = \frac{\text{the inner diameter} + \text{the outer diameter}}{2}$$

More exactly, it is a diameter equally half-dividing the area of bellows 11, said area being expressed by the following:

$$\left\{ \frac{\pi}{4} (\text{the outer diameter}^2 - \text{the inner diameter}^2) \right\}$$

Therefore, when the outer diameter of contacted edge-like sealing end portion of rotation seal ring 4 is made equal to the central diameter Dm of bellows 11, the pressure receiving area $S_2$ of stationary seal ring 13 becomes substantially zero, to thereby make the balance ratio K substantially zero because of $K = S_2/S_1$, $S_1$ representing the area at which the sealing end surface 13a of stationary seal ring 13 is contacted with the edge-like sealing end portion 4a of rotation seal ring 4. Although the area $S_1$ is extremely small in the embodiment of the present invention, the pressure receiving area $S_2$ can be made smaller than the area $S_1$ with the result of allowing the balance ratio K to be set to substantially zero.

According to the embodiment of the present invention having such an arrangement as described above wherein the sharp edge-like sealing end portion 4a of rotation seal ring 4 is slidably contacted with the sealing end surface 13a of stationary seal ring 13, a situation can be avoided wherein only inner or outer circumferential portions of end surfaces are made slidably contacted with each other because of pressure or heat distortion of seal rings. Distortion is often caused in the case where sealing end surfaces each having a relatively large width of several millimeters are slidably contacted with each other, and where sealing end surfaces are directly contacted with each other at a part thereof while spaced from each other at the other part thereof to form a relatively large clearance therebetween because of waviness caused on sealing end surfaces in the radial direction thereof. It is possible that sealing end surface 13a and portion 4a be made opposite with a certain distance interposed therebetween over all the circumference thereof. Therefore, a sealing is made possible under the condition of boundary lubrication to thereby prevent accidental burning of seal rings and increases of liquid leakage. These effects can be achieved only when the sealing end portion 4a is formed to have an extremely narrow width of 0.1~0.3 mm at the end surface thereof, but can not be expected when seal rings are formed to have an end surface whose width is larger than 0.1~0.3 mm even if the shape of these seal rings is like that of seal ring 4. When the sealing end portion 4a is formed to have a sharp edge, the sealing end portion 4a and its adjacent portion become thinner in the radial direction thereof, so that the heat generated at the slidably contacted area between sealing end portion 4a and surface 13a is easily dissipated into the liquid to be sealed or the atmosphere, thus enabling the slidably contacted area to be cooled effectively. As the result, a situation can be avoided wherein the slidably contacted area becomes high in temperature to thereby make the lubrication bad enough to cause accidental burning. Even if the liquid to be sealed enters into between sealing end surface 13a and portion 4a and coagulates there to a film, this film is cut or scraped off from the sealing end surface 4a by the sharp edge-like sealing end portion 4a into the sealing chamber 20, so that sealing end portion 4a and surface 13a of rotation and stationary seal rings 4 and 13 which are in slidably contacted condition can always serve to effect a good sealing between them without being separated further and further from each other by the growth of coagulated film. Pieces of coagulated film scraped off into the sealing chamber 20 are carried into the discharging chamber 22 by the quenching liquid supplied through the hole 16, while said quenching liquid serves to cool those portions contacting with the liquid to be sealed, particularly the heat generated at the area where the sealing is effected.

According to the embodiment of the present invention wherein the spring face pressure imparted to the sliding contact area between sealing end surface 13a and portion 4a is set to an extremely large value from 30 to 50 kg/cm$^2$ (426.6–711 lb/in$^2$), no effective influences act on the sealing function attained by the embodiment of the present invention even if the pressure of liquid to be sealed varies or inverse pressure is experienced. A stable sealing function can therefore be achieved. In addition, since sealing end surface 13a and portion 4a are made of hard materials selected from ceramics such as WC, SiC, TiC and Al$_2$O$_3$, and are kept in the condition of boundary lubrication, they can be kept extremely low in wear and continue to achieve their sealing function for a long period even if the sealing end portion 4a is formed to have a sharp edge and the spring face pressure imparted to the sliding contact area between them is set to an extremely large value from 30 to 50 kg/cm$^2$. For example, assuming that the spring face pressure is set to a value of 40 kg/cm$^2$ and that the end face width WE of sealing end portion 4a 0.25 mm, it is when the wearing amount l of sealing end portion 4a reaches 0.08 mm that the pre-set spring face pressure becomes lower than the lower limit value 30 kg/cm$^2$. This corresponds to 8000 Hrs when the average amount of wear is 0.01 $\mu$m/Hr.

Figure 3:
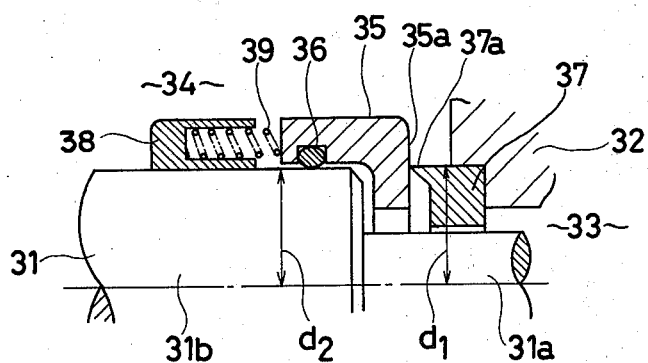
FIg. 3 is a partially sectioned view showing another embodiment of the present invention.

Although it is not always essential to the present invention that the balance ratio K is set to substantially zero, there is no fear that any inconvenience will occur even when the balance ratio K is set to substantially zero. On the contrary, if so, the sealing end portion and the sealing end surface are slidably contacted with each other under a certain pressure due to the spring face pressure regardless of the pressure change of liquid to be sealed, thus enabling a more stable sealing to be attained. The arrangement necessary to set the balance ratio K to substantially zero is not limited to the already-described embodiment of the present invention in which the bellows is employed, but may be as shown in FIG. 3, for example. Thus another embodiment of the present invention shown in FIG. 3 is located on the outer circumference of a rotation shaft 31, which is rotary, and on the inner surface of a casing 32, which is stationary. The rotation shaft 31 comprises a small-diameter portion 31a located on the atmosphere side 33 and a large-diameter portion 31b located on the side 34 of liquid to be sealed. On the outer circumference of large-diameter portion 31b of rotation shaft 31 is fitted, in water-tight fashion, an end of a rotation seal ring 35 through an O-ring 36, the other end of rotation seal ring 35 being formed to have a sealing end surface 35a. A stationary seal ring 37 having a sharp edge-like sealing end portion 37a is loosely fitted on the outer circumference of small-diameter portion 31a of rotation shaft 31, facing the sealing end surface 35a of rotation seal ring 35, and the outer circumference of stationary seal ring 37 is fixed to the inner surface of casing 32. A spring retainer 38 is fixed on the outer circumference of large-diameter portion 31b of rotation shaft 31, and the rotation seal ring 35 is urged toward the stationary seal ring 37 by means of a spring 39 held by the spring retainer 38, to thereby bring the sealing end surface 35a into sliding contact with the sealing end portion 37a. The outer diameter $d_1$ of sliding contact area between sealing end surface 35a and portion 37a measured from the center line of rotation shaft 31 is made equal to that $d_2$ of rotation shaft 31, to thereby set the balance ratio K to substantially zero.

As described above, it is possible in the present invention that various types of members conventionally used to form mechanical seals are employed except seal rings.

What we claim is:
1. In a mechanical seal for sealing liquids which are most difficult to seal, comprising:
  a movable seal ring mounted only for rotational movement and a stationary seal ring to be rotatably and slidably contacted with each other for sealing a liquid, the seal rings defining an annular sliding contact area;
  a spring member for spring-loading one of said seal rings toward the other of said seal rings;
  means for confining the liquid to be sealed in a first flow path which passes said seal ring on one side of said annular contact area, the liquid to be sealed being prone to unwanted coagulation under the influences of heat and pressure so as to form a coagulated film in the sliding contact area which tends to thicken quickly and disrupt operation of the seal; and,
  means for confining a coolant liquid in a second flow path which passes said seal rings on the other side of said annular contact area;
  said mechanical seal characterized in that:
    a smooth sealing end surface is formed at one end of one of said rotation seal ring and said stationary seal ring, and a sharp edge-like sealing end portion, having a wedge-shaped cross-section, in slidable contact with said smooth sealing end surface is formed on the other of said seal rings, said sealing end portion having a width of 0.1 to 0.3 mm (0.004 to 0.012 in), the sharp, edge-like shape tending to inhibit heat conduction from said contact area back through said end portion into said seal ring;

said seal rings are made from ceramic materials; and, the spring face pressure to be imparted by said spring member to the annular sliding contact area between said sealing end surface and said sealing end portion is set to a value from 30 to 50 kg/cm$^2$ (427 to 711 lbs/in$^2$), despite the very sharp edge-like sealing end portion, the extremely high spring face pressure further tending to raise the temperature in the sliding contact area, whereby any of the liquid to be sealed which passes through the sliding contact area is effectively cut off from its flow by a rotary cutting action within the annular contact area and is carried away by the coolant flow before it can thicken and clog the seal, making it inoperable, notwithstanding the tendancy of the liquid to be sealed to coagulate under the pressure and temperature conditions present in the sliding contact area.

2. A mechanical seal according to claim 1, in which one of said seal rings is supported by a metallic bellows having stable springy properties, and the outer diameter of that portion of said sealing end portion which slidably contacts with said sealing end surface is formed as identical to the center diameter of said bellows to permit the balance ratio K to be set to substantially zero.

3. A mechanical seal according to claim 1, in which a portion of said seal ring having the sealing end surface, which portion is opposite to the sealing end surface, is water-tightly fitted onto the outer circumference of a rotation shaft, and the outer diameter of that portion of said sealing end portion which slidably contacts with said sealing end surface is formed as identical to the outer diameter of said rotation shaft to permit the balance ratio K to be set to substantially zero.

4. The mechanical seal of claim 1, wherein the angle of the wedge-shaped edge-like sealing end portion is approximately 45°.

5. The mechanical seal of claims 1 or 4, wherein the ceramic materials are selected from the group consisting of WC, SiC, TiC and Al$_2$O$_3$.

6. The mechanical seal of claims 1 or 4, wherein the seal rings are made entirely from the ceramic materials.

7. The mechanical seal of claim 1, wherein the difficult to seal liquids include latex and rubber which tend to coagulate under shearing friction, plastic which tends to be copolymerized by the heat of sliding friction, petroleum products having a high viscosity, black liquors of the kinds formed in the pulp industry and muddy water having large amounts of slurry and particulate matter.

8. A method for mechanically sealing liquids which are most difficult to seal, comprising the steps of:

confining the liquid to be sealed in a first flow path, the liquid to be sealed being prone to unwanted coagulation under the influences of heat and pressure so as to form a coagulated film which tends to thicken quickly and disrupt operation of the seal;

confining a coolant liquid in a second flow path which intersects the first flow path in a contact area;

separating the liquid to be sealed from the coolant liquid by interposing a mechanical seal in the contact area, the mechanical seal comprising a movable seal ring mounted only for rotational movement and a stationary seal ring to be rotatably and slidably contacted with each other in the contact area; and, spring loading one of said seal rings towards the other of said seal rings;

said method characterized by:

forming a smooth sealing end surface at one end of one of said rotation seal rings and said stationary seal ring, and forming a sharp edge-like sealing end portion, having a wedge-shaped cross-section, in slidable contact with said smooth sealing end surface on the other of said seal rings, the sealing end portion being formed to have a width of 0.1 to 0.3 mm (0.004 to 0.012 inches), the sharp, edge-like shape tending to inhibit heat conduction from said contact area back through said end portion into said seal ring;

forming said seal rings from ceramics; and, imparting a spring face pressure in the sliding contact area between said sealing end surface and said sealing end portion to a value of 30 to 50 kg/cm$^2$ (427 to 711 lbs/in$^2$), despite the very sharp edge-like sealing end portion, the extremely high spring face pressure further tending to raise the temperature in the sliding contact area, whereby any of the liquid to be sealed which passes through the sliding contact area is effectively cut off from its flow by a rotary cutting action within the annular contact area and is carried away by the coolant flow before it can thicken and clog the seal, making it inoperable, notwithstanding the tendency of the liquid to be sealed to coagulate under the pressure and temperature conditions present in the sliding contact area.

9. The method of claim 8, further comprising the step of selecting the ceramics from the group consisting of WC, SiC, TiC and Al$_2$O$_3$.

* * * * *

UNITED STATES PATENT AND TRADEMARK OFFICE
CERTIFICATE OF CORRECTION

PATENT NO. : 4,335,888
DATED : June 22, 1982
INVENTOR(S) : Kanji Ohba and Shigenari Itoi It is certified that error appears in the above-identified patent and that said Letters Patent are hereby corrected as shown below:

Column 1, line 63, delete "to make" and insert therefor --, making--.

Column 2, line 63, after "face" insert --pressure--.

Signed and Sealed this

Twenty-first Day of September 1982

[SEAL]

Attest:

GERALD J. MOSSINGHOFF

Attesting Officer

Commissioner of Patents and Trademarks